(12) United States Patent
Okamura (10) Patent No.: US 7,584,434 B2
(45) Date of Patent: Sep. 1, 2009

(54) SYSTEM AND METHOD OF DISPLAYING MAP IMAGE

(75) Inventor: Junichi Okamura, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 643 days.

(21) Appl. No.: 10/200,129

(22) Filed: Jul. 23, 2002

(65) Prior Publication Data

US 2003/0038845 A1 Feb. 27, 2003

(30) Foreign Application Priority Data

Aug. 24, 2001 (JP) .............................. 2001-255159

(51) Int. Cl.
*G06F 3/00* (2006.01)
*G06F 3/14* (2006.01)

(52) U.S. Cl. ...................... 715/765; 715/866; 715/764; 715/781; 707/104.1

(58) Field of Classification Search ................ 715/700, 715/764, 765, 781, 784, 866; 345/428, 619, 345/660, 667; 701/1, 24, 200, 208; 707/104.1, 707/7, 10
See application file for complete search history.

(56) References Cited

U.S. PATENT DOCUMENTS

| | | | | |
|---|---|---|---|---|
| 4,876,651 | A * | 10/1989 | Dawson et al. ............... | 701/200 |
| 5,821,880 | A * | 10/1998 | Morimoto et al. ...... | 340/995.21 |
| 5,897,619 | A * | 4/1999 | Hargrove et al. ................ | 705/4 |
| 6,202,026 | B1 * | 3/2001 | Nimura et al. ............... | 701/211 |
| 6,262,741 | B1 * | 7/2001 | Davies ........................ | 345/423 |
| 6,307,573 | B1 * | 10/2001 | Barros ......................... | 715/764 |
| 6,330,858 | B1 * | 12/2001 | McDonough et al. ........ | 101/208 |
| 6,336,072 | B1 * | 1/2002 | Takayama et al. ........... | 701/200 |
| 6,366,263 | B1 * | 4/2002 | Takasu et al. ................. | 345/13 |
| 6,377,278 | B1 * | 4/2002 | Curtright et al. ............ | 345/634 |
| 6,487,305 | B2 * | 11/2002 | Kambe et al. ............... | 382/113 |
| 6,671,619 | B2 * | 12/2003 | Kusano et al. .............. | 701/209 |

(Continued)

FOREIGN PATENT DOCUMENTS

EP 1052598 A2 * 11/2000

(Continued)

OTHER PUBLICATIONS

Peter Jacso, "A graphics file format for the future", Jul. 1998, Information Today, v 15, n 7, p. 29-30.*

(Continued)

*Primary Examiner*—X. L Bautista
(74) *Attorney, Agent, or Firm*—Arent Fox LLP (57) ABSTRACT

A map database site S comprises a map information database Sb for accumulating the map data constructed of units for displaying of unit images m each having a display range smaller than a display range of a map image M corresponding to one page of a map image displayed on a user terminal T, in association with position data indicating the display ranges of the individual unit images m. A user terminal T comprises map-image display means for combining the map data of a plurality of units with each other on the basis of the associated position data, which are read out from the map information database Sb provided in the map database site S and transmitted from the map database site S, to form the one-page map image M for display.

18 Claims, 6 Drawing Sheets

U.S. PATENT DOCUMENTS

| | | | | |
|---|---|---|---|---|
| 6,678,615 | B2* | 1/2004 | Howard et al. | 702/5 |
| 6,691,114 | B1* | 2/2004 | Nakamura | 707/10 |
| 6,704,027 | B2* | 3/2004 | Nakano | 345/636 |
| 6,760,027 | B2* | 7/2004 | Endo et al. | 345/427 |
| 6,833,851 | B1* | 12/2004 | Brunk | 715/798 |
| 6,943,805 | B2* | 9/2005 | Snyder et al. | 345/589 |
| 2001/0024203 | A1* | 9/2001 | Yamada et al. | 345/428 |
| 2001/0028350 | A1* | 10/2001 | Matsuoka et al. | 345/427 |
| 2002/0038215 | A1* | 3/2002 | Yamamoto et al. | 704/275 |
| 2002/0048054 | A1* | 4/2002 | Ohata et al. | 358/500 |
| 2002/0067379 | A1* | 6/2002 | Kenyon et al. | 345/838 |
| 2002/0103597 | A1* | 8/2002 | Takayama et al. | 701/200 |
| 2002/0175924 | A1* | 11/2002 | Yui et al. | 345/660 |
| 2003/0083809 | A1* | 5/2003 | Hatano | 701/207 |
| 2003/0088561 | A1* | 5/2003 | Yajima et al. | 707/4 |
| 2004/0012506 | A1* | 1/2004 | Fujiwara et al. | 340/995.1 |
| 2005/0004945 | A1* | 1/2005 | Cossins et al. | 707/104.1 |
| 2005/0052462 | A1* | 3/2005 | Sakamoto et al. | 345/473 |

FOREIGN PATENT DOCUMENTS

| | | | |
|---|---|---|---|
| JP | 363066677 | * | 3/1988 |
| WO | WO 00/10325 | * | 2/2000 |

OTHER PUBLICATIONS

Neal Cyganiak, "Auto Maps Computer Map Design", 1987, American Cartographer, v 14, n 3, p. 269-270.*

Jim Boyce, "PixEdit 5 . 1 .12.", Mar. 2001, Software Review, Cadence, v16, n3, p. 35.*

Anonymous, "Stadtplandienst: Finden und gefunden warden", Internet Article, XP002338999 (Jan. 25, 1999), no translation provided.

Anonymous, "Stadtplandienst: Berlin Map Query", Internet Article, XP002340801 (Apr. 25, 2000), no translation provided.

* cited by examiner

SYSTEM AND METHOD OF DISPLAYING MAP IMAGE

BACKGROUND OF THE INVENTION

1. Field of the Invention

This invention relates to a system of providing map data accumulated in a server through a computer network to a user terminal for the display of a map image, and a method of displaying the map image.

The present application claims priority from Japanese Application No. 2001-255159, the disclosure of which is incorporated herein by reference for all purposes.

2. Description of the Related Art

Information providing services of providing various types of information through a computer network such as the Internet include a map-information providing service for providing map data accumulated in a server through the computer network to a user terminal connected to the computer network as required, to allow the user terminal to display a desired map image.

Figure 6:
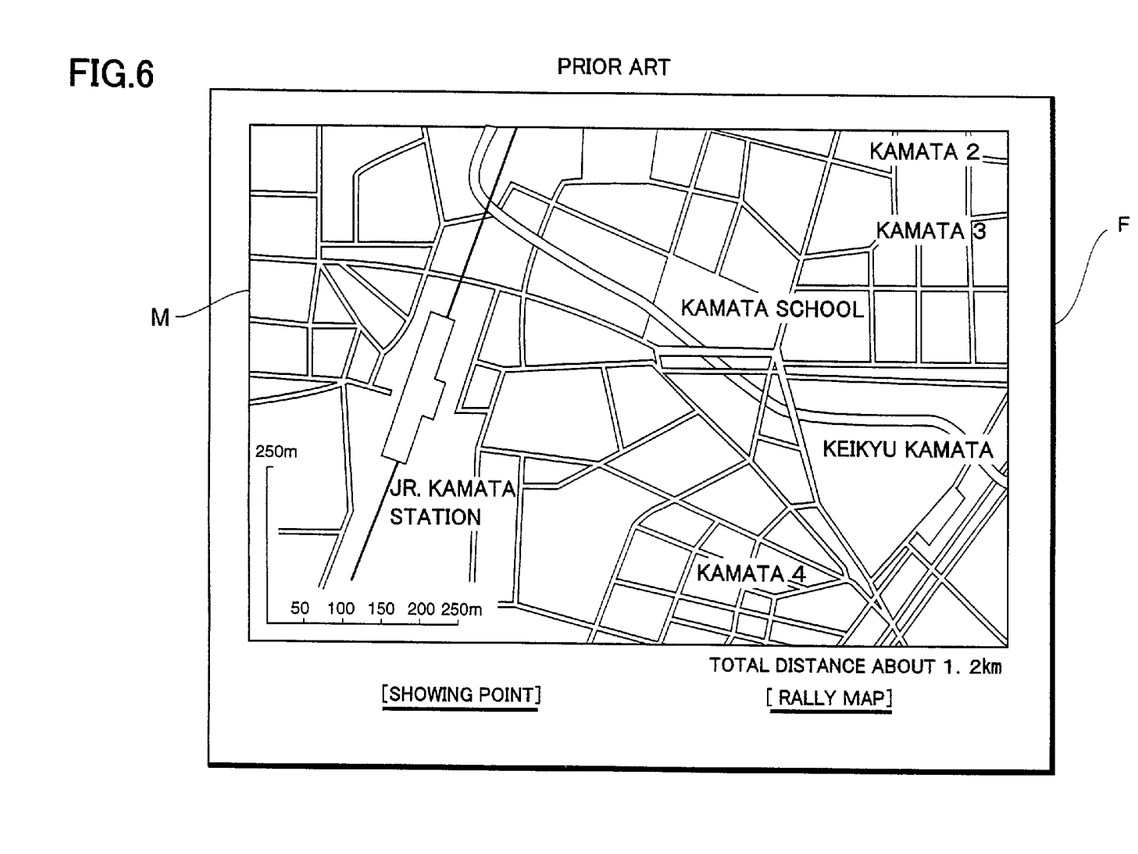
FIG. 6 is an explanatory diagram illustrating display of a map image in the prior art.

FIG. 6 illustrates an example of map images displayed on the user terminal on the basis of map data provided by the map-information providing service as described above.

As shown in FIG. 6, in order to display a map image M within a map-image display frame F of a Web page for providing various types of map information, e.g., route retrieval and public-building retrieval for a navigation system, map data corresponding to the map image to be displayed must be downloaded from a map database site connected through the computer network to the user terminal in accordance with a request from the user terminal.

Conventionally, the map data for displaying the map image M in the web page is accumulated in a database in the map database site in such a way of forming a single data file for each map image displayed within the map-image display frame F. Upon a request from the user terminal, one of the data files corresponding to the request is read out from the map data files accumulated in the database, and transmitted to the user terminal to provide a display of the map image within the map-image display frame F in the web page displayed on the user terminal.

In this way, the user can display a desired map image in the web page by performing required operations, e.g. the inputting into the user terminal of a keyword for specifying an area of map to be displayed such as a place name, address, public-building name and the like.

However, in such a conventional system of displaying a map image as described above, for displaying a new map image besides the map image displayed in the map-image display frame F in the web page, the new map image has to be generated from a data file differing from the data file that includes the previous map image.

Accordingly, the data file including the new map image to be displayed is downloaded from the map database site, and the map-image display processing is performed once again from the beginning on the basis of the downloaded data file.

For this reason, even if the map image of an area required to be displayed is directly adjacent to an area of the displayed map image, for example, in the case of a web page configured to permit a display selecting operation for moving the center point of the existing map image on the screen so as to show an area adjacent thereto, when the display selecting operation is performed, the conventional system of displaying map images as described above newly performs the display processing for a map image corresponding to the area adjacent to the existing map image on the basis of another map data file.

Hence, the conventional system has the problem of the impossibility of smoothly changing map images because of the long time lag until a new map image is displayed.

Further, for the reason that a map image displayed in a map-image display frame F in a web page is generated from an individual map data file, the user has problems associated with the use of map images, e.g., he/she will need time and effort for checking the continuity between the already displayed map image and the newly displayed map image, and may lose sight of a target position on the map image.

SUMMARY OF THE INVENTION

The present invention has been made to solve the above problems associated with the conventional system of displaying map images as described above, in which a map image is displayed on a user terminal on the basis of map data provided from a map database site through a computer network.

Accordingly, it is a first object of the present invention to provide a system of displaying map images which is capable of smoothly changing a display range of the map image on a user terminal in a short time, and also of allowing a user to check continuity of the map image switched for display with ease, when the map image is displayed on the user terminal on the basis of map data provided from a map database site through a computer network.

It is a second object of the present invention to provide a method of displaying map images implemented by the system of displaying the map images provided for attaining the first object.

To attain the first object, a system of displaying map images according to the present invention has a first feature of allowing a user terminal to display a map image on the basis of map data transmitted from a map database site through a computer network. The first feature is that the map database site comprises a map information database for accumulating the map data constructed of units for displaying map images each with a display range smaller than a display range of a map image corresponding to one page displayed on a user terminal, in association with position data indicating the display ranges of the individual map images. The first feature is also that the user terminal comprises map-image display means for combining the map data of a plurality of units with each other on the basis of the position data of the map data, which are read out from the map information database provided in the map database site and transmitted from the map database site, to form the map image corresponding to one page for display.

The system of displaying map images of the first feature is designed such that the one-page map image displayed, for example, within a map-image display frame in a web page on the user terminal is configured by an arrangement of a plurality of map images of the smaller display ranges defined as required, in which the map data for displaying each of the map images of the smaller display range, together with the associated position data indicating the display range, are handled as data of a unit, and the map data with the associated position data are accumulated in units in the map information database of the map database site.

Upon the input of information (e.g., addresses, rail-station names) for specifying the one-page map image to be displayed on the user terminal, the user terminal transmits the input information to the map database site. Then the map database site determines the display range of the map image corresponding with the input information, reads out from the map information database each unit of the map data for displaying each of the map images included in the determined display range of the one-page map image on the basis of the associated position data, and then transmits them to the user terminal through the computer network.

On the basis of the map data of a plurality of the units transmitted from the map database site, the user terminal displays the map images in display positions each detected in accordance with the associated position data to form a one-page map image designated by the user.

According to the first feature, the single map image displayed on the user terminal is formed by means of the combination of the map data of a plurality of units for displaying map images each having a display range smaller than that of the single map image.

Hence, when a center point of the display range of the one-page map image designated on the user terminal screen is moved, the system allows the user terminal to re-display a new one-page map image with a changed center point simply by the reception, from the map database site, of a unit or units of map data required for displaying a map image or map images corresponding to the newly added sections of the display range of the one-page map image.

Accordingly, it is possible to smoothly move the display range of the one-page map image on the user terminal with a short time. Additionally, since a section overlapping between the map image after moving and the map image before moving is displayed in accordance with the degree to which the display range is moved, it is possible for the user to check the continuity of the map images with ease when the display is switched.

To attain the first object, a system of displaying map images according to the present invention has, in addition to the configuration of the first feature, a second feature that the map database site selects the units of the map data to be read out from the map information database, on the basis of coordinate data, indicating the display range of the map image designated on the user terminal, and the position data included in each of the units of the map data, for transmission to the user terminal.

According to the second feature, upon the input of information (e.g., addresses, a rail-station names) for specifying a map image to be displayed on the user terminal, the coordinate data indicating the display range of the map image designated from the input information is determined, and then the map information database is searched for on the basis of the determined coordinate data.

The map database site reads a group of units of the map data corresponding to the display range of the one-page map image designated on the user terminal, from the map information database, and then transmits them to the user terminal through the computer network.

To attain the first object, a system of displaying map images according to the present invention has, in addition to the configuration of the first feature, a third feature that the map-image display means detects display positions in relation to the display range of the map image designated on the user terminal, on the basis of the position data included in the individual units of the map data transmitted from the map database site, and displays the map images, generated from the map data of the respective units, in the corresponding display positions detected.

According to the third feature, when displaying the map images generated from each of the units of the map data transmitted from the map database site, each of the display positions for displaying the map images of the map data of the units within the display range of the one-page map image designated on the user terminal is detected on the basis of the position data included in the corresponding unit, thereby displaying the map image generated from the map data of each unit in the relevant detected display positions.

To attain the first object, a system of displaying map images according to the present invention has, in addition to the configuration of the third feature, a fourth feature that when the units of the map data for displaying the map images in the detected display positions include map data on a section outside the display range of the map image designated, the map-image display means detects map data on a section included within the display range of the designated map image, from the map data of the units concerned for display of map images.

According to the fourth feature, when the display area of the one-page map image displayed on the user terminal is not equal to an integral multiple of the display areas of the map images generated from the map data of the individual units, with regard to the unit of the map data for displaying map image straddling the display region and the non-display region of the map image on the user terminal, the map-image display means selects the map data for displaying a map image of the section included in the display region of the map image on the user terminal, from the map data of the unit concerned, and then displays the map image based on the selected map data.

To attain the first object, a system of displaying map images according to the present invention has, in addition to the configuration of the first feature, a fifth feature that when a change in the designation of the display range of the map image is made on the user terminal, the map-image display means reads out, from the units of the map data cached when the map image before the change is made, the map data of units common to the map data forming the map image before the change is made, and the map data forming the map image to be displayed after the change is made, in order to display the map image after the change is made.

According to the fifth feature, for example when the coordinates of the center point of the one-page map image displayed on the user terminal is moved in a north, south, east or west direction in order to display a map image of the section of surrounding the one-page map image, the user terminal does not need to repeat the operation of obtaining, from the map database site, the units of the map data used for displaying the one-page map image before change as part of the units of the map data for displaying the one-page map image after the change of the coordinates of the center point of the previous one-page map image.

This is because the units of the map data cached when the map image before change has been displayed are read out for use.

Accordingly the user terminal obtains the unit or units of the map data from the map database site, only for the map image or images of the section newly displayed after the change is made, for displaying the new single map image.

To attain the first object, a system of displaying map images according to the present invention has, in addition to the configuration of the fifth feature, a sixth feature that when the map data cached are read out for displaying the map image, the map-image display means transmits data representing versions of the units of the map data concerned to the map database site, and when the map database site determines, based on the transmitted data, that a unit of map data of an updated version is not registered in the map information database, the map-image display means displays the map image on the basis of the cached map data, and when the map database site determines, based on the transmitted data, that a unit of map data of an updated version is registered in the map information database, the map-image display means receives the unit of the map data of the updated version from the map database site for displaying the map image.

According to the sixth feature, when a change is made to the display range of the map image and therefore the user terminal displays a new map image based on the cached map data, the user terminal transmits the data representing the versions of the units of the cached map data to the map database site.

The map database site performs a comparison between the version of each of the units of the map data represented by the data transmitted from the user terminal, and a version of the corresponding unit of map data registered in the map information database, to determine whether the version of the unit of the cached map data is the latest one or not.

When it is determined that the version of the unit of the cached map data is the latest one, the user terminal displays the map image on the basis of the map data of the unit cached. When it is determined that the version of the unit of the cached map data is not the latest one, the map database site reads out the unit of the map data of the latest version registered in the map information database, and transmits it to the user terminal. Then the user terminal displays the map image on the basis of the map data of the latest version of the unit.

Thus, the user terminal displays map images based on the latest information at all times.

To attain the second object, the present invention provides a method of displaying map images for allowing a user terminal to display a map image on the basis of map data transmitted from a map database site through a computer network, having a seventh feature of comprising the steps of:

accumulating, in a map information database provided in the map information database site, the map data constructed of units for displaying map images each with a display range smaller than a display range of a map image corresponding to one page to be displayed on the user terminal, in association with position data indicating the display ranges of the individual map images; and
   combining, in the user terminal, a plurality of map images generated from the map data of the individual units on the basis of the position data of the map data, which are read out from the map information database of the map database site and transmitted from the map database site, to form the map image corresponding to one page for display.

The method of displaying the map images of the seventh feature is designed such that the single map image displayed, for example, within a map-image display frame in a web page on the user display is configured by an arrangement of a plurality of map images of the smaller display ranges defined as required, in which the map data for displaying each of the map images of the smaller display range, together with the associated position data indicating the display range, are handled as data of a unit, and the map data with the associated position data of a plurality of units are accumulated in the map information database of the map database site.

Upon the input of information (e.g., addresses, rail-station names) for specifying the map image to be displayed on the user terminal, the user terminal transmits the input information to the map database site. Then the map database site determines the display range of the map image according to the input information, reads out from the map information database the units of the map data for displaying the map images included in the determined display range of the one-page map image on the basis of the associated position data, and then transmits them to the user terminal through the computer network.

On the basis of the map data of a plurality of the units transmitted from the map database site, the user terminal displays the map images in display positions each detected in accordance with the associated position data to form a single map image designated by the user.

According to the seventh feature, the single map image displayed on the user terminal is formed by means of the combination of the map data managed in a plurality of units for displaying map images each having a display range smaller than that of the single map image.

Hence, when a center point of the display range of the single map image designated on the user terminal screen is moved, the system allows the user terminal to re-display a new one-page map image with a changed center point simply by reception, from the map database site, of a unit or units of map data required for displaying a map image or map images corresponding to the newly added sections of the display range of the one-page map image.

Accordingly, it is possible to smoothly move the display range of the single map image on the user terminal with a short time. Additionally, since a section overlapping between the map image after moving and the map image before moving is displayed in accordance with the degree to which the display range is moved, it is possible for the user to check the continuity of the map images with ease when the display is switched.

To attain the second object, a method of displaying map images according to the present invention has, in addition to the configuration of the seventh feature, an eighth feature of further comprising the step of making, in the map database site, a comparison between coordinate data indicating the display range of the map image designated on the user terminal, and the position data included in each of the units of the map data, in order to select and read out the units of the map data for displaying the map images within the display region of the designated map image from the map information database.

According to the eighth feature, upon the input of information (e.g., addresses, a rail-station names) for specifying a map image to be displayed on the user terminal, the coordinate data indicating the display range of the map image designated from the input information is determined, and then the map information database is searched for on the basis of the coordinate data.

The map database site reads a group of units of the map data corresponding to the display range of the single map image designated on the user terminal, from the map information database, and then transmits them to the user terminal through the computer network.

To attain the second object, a method of displaying map images according to the present invention has, in addition to the configuration of the seventh feature, a ninth feature of further comprising the steps of:

detecting display positions in relation to the display range of the map image designated on the user terminal, on the basis of the position data included in the individual units of the map data transmitted from the map database site; and
   displaying the map images generated from the map data of the respective units in the corresponding display positions detected.

According to the ninth feature, when displaying the map image generated from each of the units of the map data transmitted from the map database site, each of the display positions for displaying the map images of the map data of the units within the display range of the one-page map image designated on the user terminal is detected on the basis of the position data included in the corresponding unit, thereby displaying the map image generated from the map data of each unit in the relevant detected display positions.

To attain the second object, a method of displaying map images according to the present invention has, in addition to the configuration of the ninth feature, a tenth feature of further comprising the step of:

determining whether or not the units of the map data for displaying the map images in the detected display positions include map data representing a section outside the display range of the map image designated, to prevent displaying of a map image represented by map data corresponding to the section outside the display range of the designated map image, of the map data of the determined units.

According to the tenth feature, when the display area of the one-page map image displayed on the user terminal is not equal to an integral multiple of the display areas of the map images generated from the map data of the individual units, with regard to the unit of the map data for displaying the map image straddling the display region and the non-display region of the map image on the user terminal, the map data for displaying a map image of the section included in the display region of the single map image on the user terminal, is selected from the map data of the unit concerned, and then the map image based on the selected map data is displayed.

To attain the second object, a method of displaying map images according to the present invention has, in addition to the configuration of the seventh feature, an eleventh feature of further comprising the steps of:

determining, when a change in the designation of the display range of the map image is made on the user terminal, whether or not there exists units common to the map data forming the map image displayed before the change is made, and the map data forming the map image to be displayed after the change is made; and reading out the common units from the units of the map data cached at the time when the single map image is displayed before the change is made, for displaying the map image after the change is made.

According to the eleventh feature, for example when the coordinates of the center point of the one-page map image displayed on the user terminal is moved in a north, south, east or west direction in order to display a map image of the section of surrounding the one-page map image displayed on the user terminal, the user terminal does not need to repeat the operation of obtaining, from the map database site, the units of the map data used for displaying the one-page map image before change as part of the units of the map data for displaying the one-page map image after the change in the coordinates of the center point of the previous one-page map image.

This is because the units of the map data cached at the time when the map image before change has been displayed are read out for use.

Accordingly the user terminal obtains the unit of the map data from the map database site, only for the map image or images of the section newly displayed after the change is made, for display the new single map image.

To attain the second object, a method of displaying map images according to the present invention has, in addition to the configuration of the eleventh feature, a twelfth feature of further comprising the steps of:

transmitting data representing versions of the units of the map data read out from the map data cached, to the map database site;

determining, in the map database site, whether or not an updated version of a unit of map data is registered in the map information database, on the basis of the transmitted data; and after determining that the updated version of the unit of the map data is not registered, displaying the map image on the basis of the cached map data; or after determining that the updated version of the unit of the map data is registered, displaying the map image on the basis of the map data of the unit of the updated version transmitted from the map database site.

According to the twelfth feature, when a change is made to the display range of the map image and therefore the user terminal displays a new map image based on the cached map data, the user terminal transmits data representing versions of the units of the cached map data to the map database site.

The map database site performs a comparison between the version of the unit of the map data represented by the data transmitted from the user terminal, and a version of the corresponding unit of map data registered in the map information database, to determine whether the version of the unit of the cached map data is the latest one or not.

When it is determined that the version of the unit of the cached map data is the latest one, the user terminal displays the map image on the basis of the map data of the unit cached. When it is determined that the version of the unit of the cached map data is not the latest one, the map database site reads out the unit of the map data of the latest version registered in the map information database, and transmits it to the user terminal. Then the user terminal displays the map image on the basis of the map data of the latest version of the unit.

These and other objects and features of the present invention will become more apparent from the following detailed description with reference to the accompanying drawings.

DETAILED DESCRIPTION OF THE PREFERRED EMBODIMENT

One of preferred embodiments according to the present invention will be described hereinafter in detail with reference to the accompanying drawings.

Figure 1:
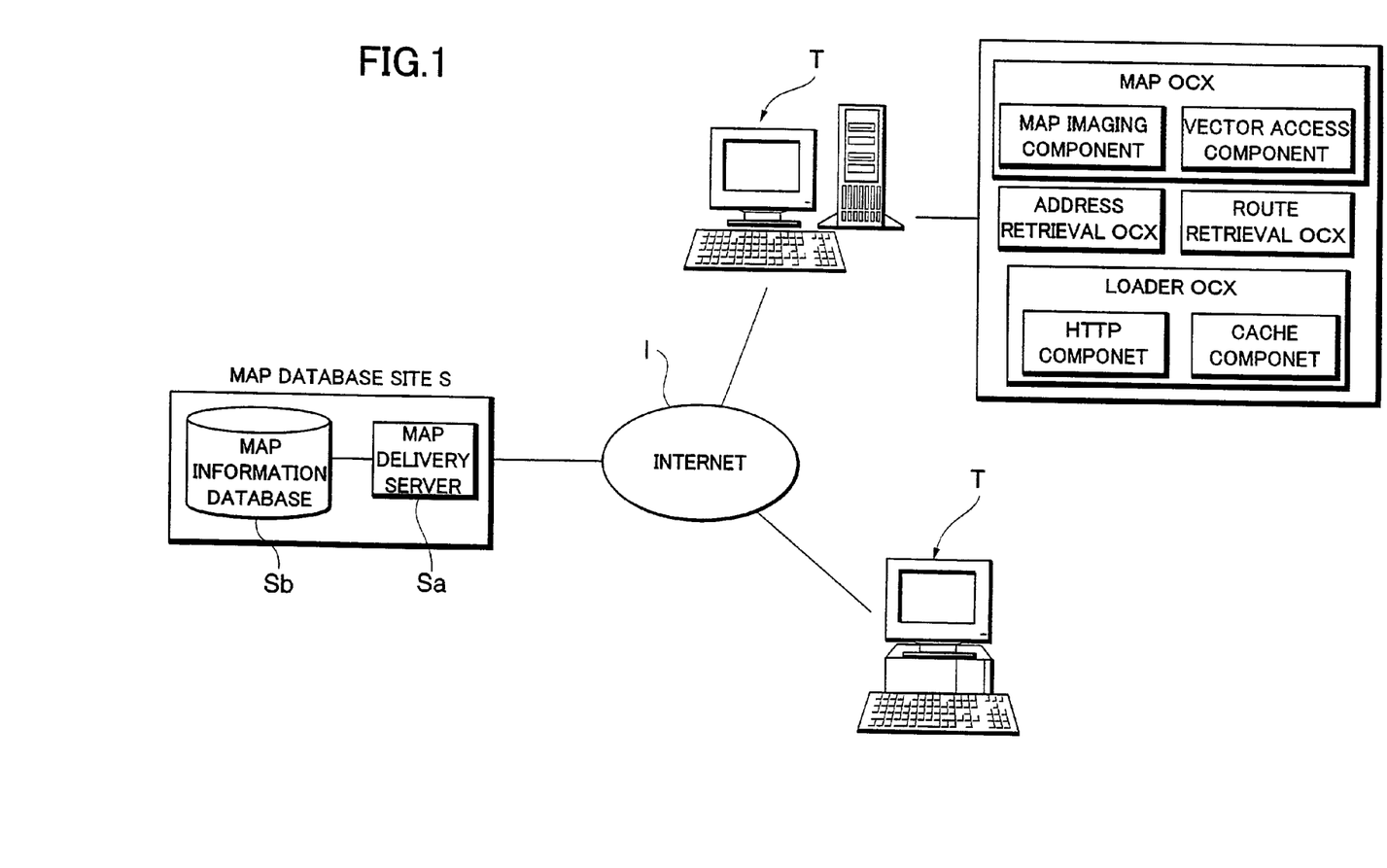
FIG. 1 is a block diagram illustrating a system according to a preferred embodiment of the present invention.

FIG. 1 is a schematic representation illustrating a computer network comprising a map database site S and user terminals T which are connected through the Internet I in the preferred embodiment of a system of displaying map images according to the present invention.

In FIG. 1, the map database site S performs the service of providing map data for allowing the user terminal T to display a map image in response to a request transmitted from the user terminal T through the Internet, and includes a map delivery server Sa and a map information database Sb for accumulating map data for delivery.

The map delivery server Sa of the map database site S includes a retrieval CGI (Common Gateway Interface) for searching the map database Sb for map data corresponding to input information, e.g. place names, addresses, rail-station names, which is transmitted from the user terminal T through the Internet for specifying a map image subject to display; and a delivery CGI for delivering the map data retrieved by the retrieval CGI to the user terminal T which originated the request.

The delivery CGI in turn includes: a vector map-data delivery CGI for delivering vector map data, used for displaying map images, in units as described later; a scale mask data delivery CGI for delivering information on the scale and display range of the map image subject to be displayed from the vector map data; and a place-name data delivery CGI for delivering information on place names in the map image subject to be displayed from the vector map data.

The map data accumulated in the map information database Sb of the map database site S includes: vector map data for displaying a map image with vector graphics; scale mask data for indicating the scale and display range of the map image subject to be displayed from the vector map data; and place-name data for indicating place names in the map image subject to be displayed from the vector map data.

As described later, the vector map data is constructed of files each one created for each map image with a predetermined range established by latitudes and longitudes, in which the vector map data for displaying each map image is managed as a unit (hereinafter referred to as "unit map data file").

A unit map data file is created for each scale, e.g., one in 1,600,000, one in 200,000, one in 25,000, one in 1562 etc. Each of the files includes position data for indicating a selected position within a unit image to be displayed from the vector map data in terms of latitude and longitude.

Each of the unit map data files for each scale has attached to it a scale mask data file and a place name data file corresponding to the vector map data thereof which are accumulated in the map information database Sb.

A description follows of the setting of a display range of a map image generated from the vector map data of a single unit map-data file.

A single map image M displayed within a map-image display frame F in a web page (see FIG. 6) is configured with an arrangement in columns and rows of a plurality of map images (each of the map images hereinafter referred to as "unit image m") each to be displayed from the vector map data of a single unit map data file.

Figure 2:
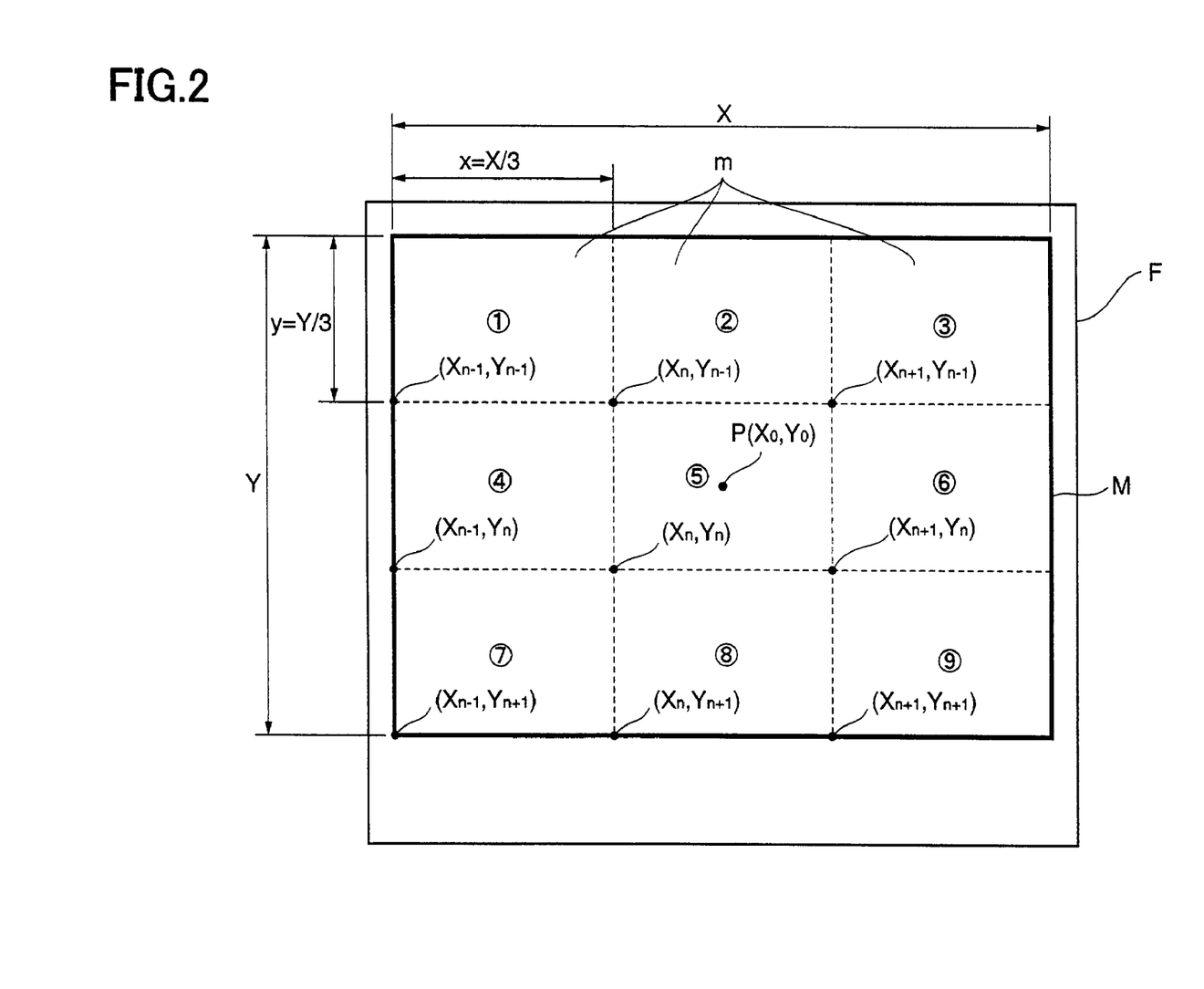
FIG. 2 is an explanatory diagram illustrating a display range of a map image in the embodiment.

In the embodiment, in a basic configuration as illustrated in FIG. 2, the nine unit images m arranged in columns and rows form a single map image M.

A longitudinal extent X and a latitudinal extent Y demarcating the display range of a map image M within the map image display frame F are determined by the scale of the map image M to be displayed. From this fact, the embodiment shown in FIG. 2 sets a longitudinal extent x and a latitudinal extent y demarcating a display range of a unit image m on the basis of $x=X/3$ and $y=Y/3$, which are found by dividing both the longitudinal extent X and the latitudinal extent Y of the map image M into three equal parts.

In other words, when the display range of the map image M within the map-image display frame F is set at 960×720 pixels, for example, the unit image m to be displayed from the vector map data of each of the unit map data files is set to have a display range of 320×240 pixels.

As illustrated in FIG. 1, the user terminal T includes map OCX (OEL Custom Control) having a map imaging component for displaying a map image and a vector access component performing processing for vector data, and loader OCX having a HTTP component and a cache component.

The user terminal T further includes a variety of control programs for utilizing map information in the user terminal T, such as address retrieval OCX, route retrieval OCX, and the like.

Next, a description will be given of the procedure for displaying a map image on the user terminal T in the above system of displaying map images.

As described above, FIG. 2 illustrates an arrangement in three columns and three rows of the nine unit images m forming a single map image M to be displayed within the map image display frame F in a web page.

First, the steps of displaying the map image M in FIG. 2 will be described.

When the user inputs information on addresses, rail-station names and the like for specifying a map image to be displayed and designates the scale of the map image, the user terminal T operates the map OCX (see FIG. 1) to compute a longitude Xo and a latitude Yo of a center point P of the map image M required for display, and then to compute a longitudinal extent X and a latitudinal extent Y representing a display range of the map image M on the basis of the scale designated by the user, from the computed center point P (Xo, Yo).

Next, the map OCX derives vector map data for displaying unit images m forming the map image M, from the computed longitudinal and latitudinal extents X and Y.

The vector map data is derived through the following steps.

Within the display range of a map image M, coordinates (Xn, Yn) of the longitude and the latitude are preset in a position matching any one of the four corners (the bottom left corner in the example of FIG. 2) of each of the unit images m which are arranged to form the map image M, for each scale of a map image to be displayed. Therefore, first, the map OCX derives all the coordinate values (Xn, Yn) existing in the display range of the map image M on the basis of the longitudinal extent X and the latitudinal extent Y already computed as explained above.

Next, the map OCX uses the derived coordinate values (Xn, Yn) as parameters for retrieving the unit map data files having the position data corresponding thereto.

For the retrieval of the unit map data files, when the user terminal T is not connected to the map database site S through the Internet I, the map COX checks whether or not the unit map data files having the position data matching the respective coordinate values (Xn, Yn) are cached in the cache component of the loader OCX. If cached, the map COX reads the cached unit map data files.

As a result of checking, if the unit map data file having the position data matching the respective coordinate value (Xn, Yn) is not cached, the user terminal T operates the HTTP component to connect with the map database site S through the Internet I to obtain the corresponding unit map data file therefrom.

At this point, the map delivery server Sa of the map database site S launches the delivery CGI, and then searches the map information database Sb with the use of the coordinate values (Xn, Yn) as the CGI parameters based on the data representing the coordinate values (Xn, Yn) transmitted from the user terminal T, to read out the corresponding unit map data file for transmission to the user terminal T.

Concurrently with this, the scale mask data file and place-name data file corresponding to the unit map data file thus read are transmitted to the user terminal T.

On the other hand, when the user terminal T retrieves the unit map data file while being connected to the map database site S through the Internet I, as in the above case, first the user terminal T checks for the presence of a cached unit map data file.

If a cached unit map data file exists, the user terminal T transmits data on the version of the cached unit map data file to the map database site S to determine whether the version of the unit map data file is the latest or not.

For this determination, the map delivery server Sa of the map database site S retrieves the unit map data file as in the above case, and performs a comparison between the version of the retrieved unit map data file and the version of the cached unit map data file represented by the data transmitted from the user terminal T.

As a result of the determination, if the version of the cached unit map data file is the latest, the map database site S allows the user terminal T to read the cached unit map data file.

If it is not the latest, the map delivery server Sa of the map database site S reads a unit map data file of the latest version from the map information database Sb, and transmits it to the user terminal T.

In the checking process for the presence of a cached unit map data file, if the unit map data file is not cached in the user terminal T, as described earlier, the map delivery server Sa of the map database site S reads the corresponding unit map data file from the map information database Sb for transmission to the user terminal T.

In this way, when each of the unit map data files for displaying the unit images m forming the map image M is read from the cache memory or transmitted from the map database site S, the map OCX of the user terminal T permits display of the unit images m in the corresponding display positions ① to ⑨ within the display range for the map image M on the basis of the respective unit map data files.

Thus, the unit images m are displayed in all the regions within the display range of the map image M to form the single map image M.

The display position of each of the unit images m is determined, as described earlier, by comparing the position data included in the unit map data file and the coordinate values (Xn, Yn) in the bottom left corner of each of the display range of the unit image m, the coordinate values (Xn, Yn) being determined by the longitudinal extent X and the latitudinal extent Y in the display range of the map image M.

FIG. 2 illustrates a case where the display area of the map image M equals the total display areas of the nine unit images m.

Figure 3:
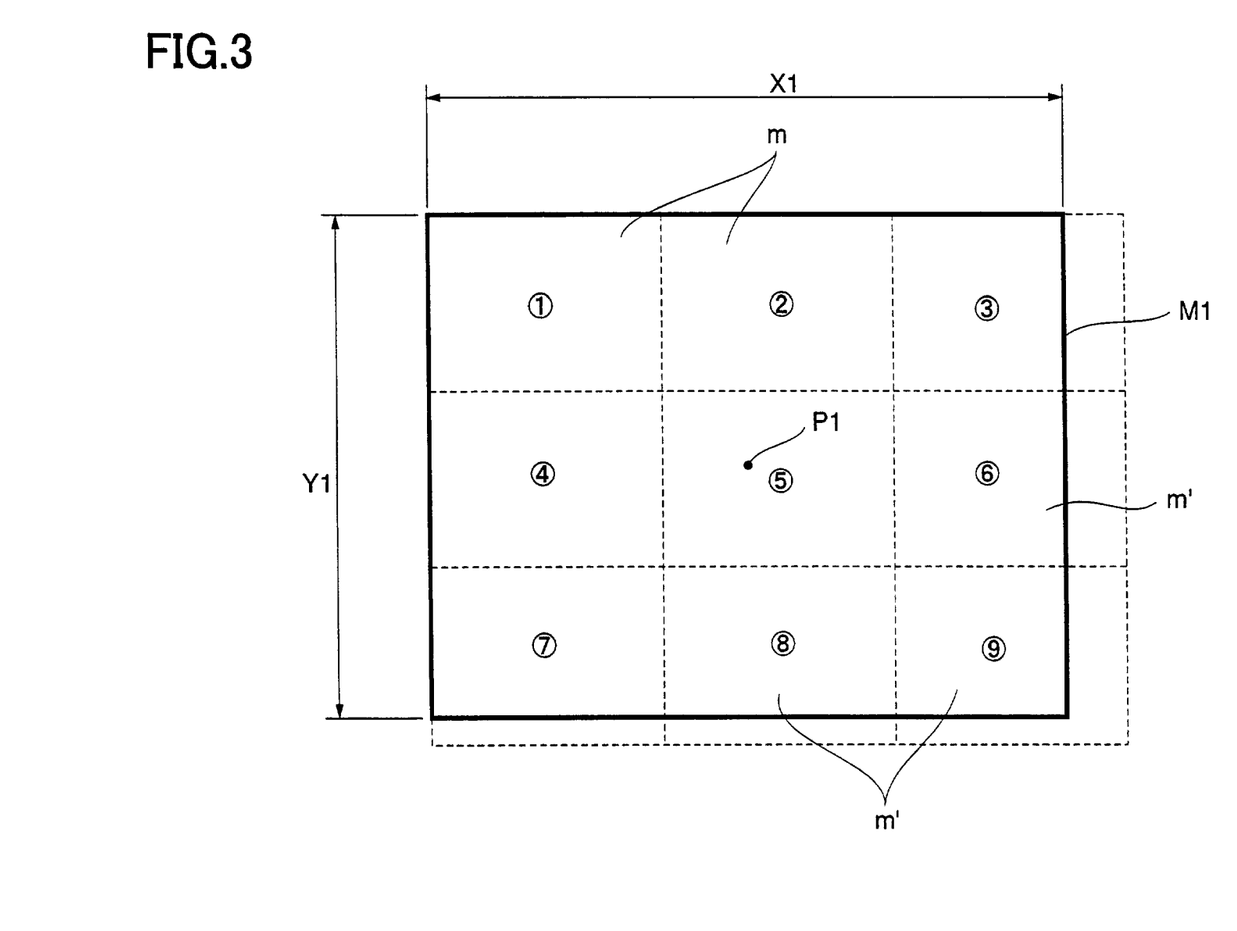
FIG. 3 is an explanatory diagram illustrating another display range of a map image in the embodiment.

However, there may be cases where the display area of the map image M does not correspond to a value of the integral multiple of a display area of each of the unit images m: for example, when a map image M1 has a display area smaller than the total display areas of the nine unit images m, as illustrated in FIG. 3. In such a case, when a display position is situated on the peripheral edge of the display range of the map image M1 so as to result in the display of only part of the range of the corresponding unit images m (i.e. each of the display positions ③, ⑥, ⑦, ⑧ and ⑨ in FIG. 3), the map OCX compares the position data of a unit map data file corresponding to a unit image m' displayed in the display position concerned, with the longitudinal and latitudinal extents X1 and Y1 indicating the display range of the map image M1 and the coordinate values (Xn, Yn) existing within the display range.

From the results of the comparison, the map OCX selects data, which is used for displaying the section of the unit image m' included in the display range of the map image M1, from vector map data included in the unit map data file, in order to display the unit image m' on the basis of the selected data.

Figure 4:
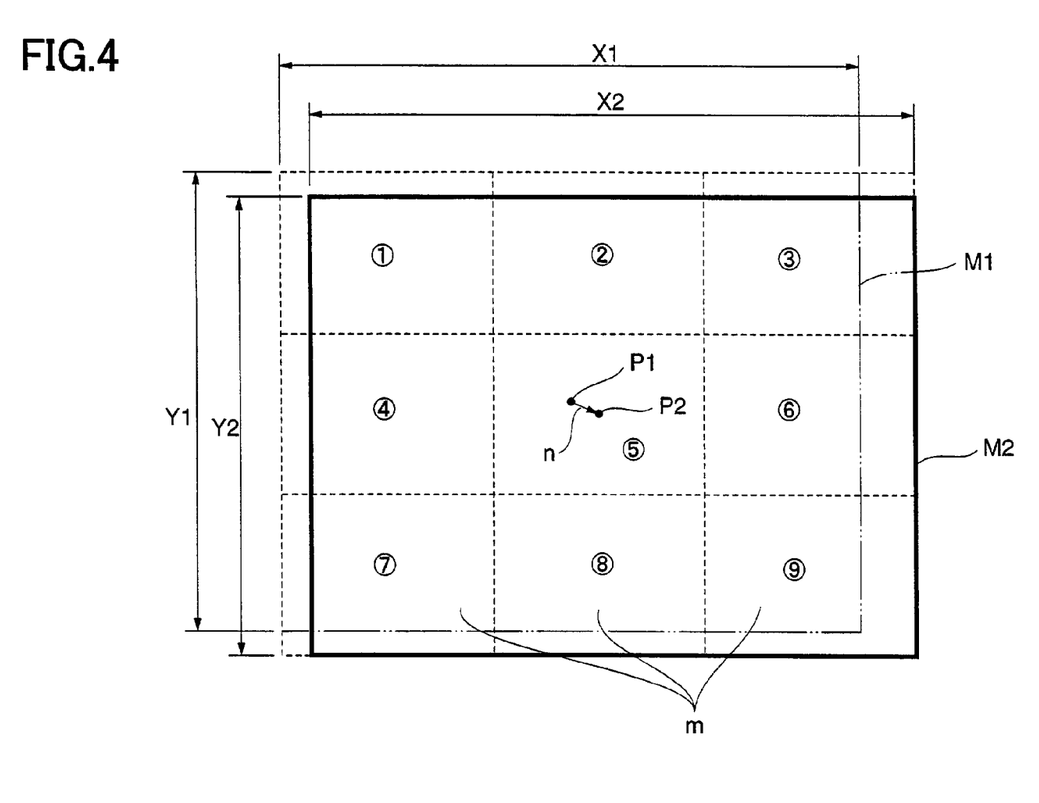
FIG. 4 is an explanatory diagram illustrating an example of moving the display range of the map image in FIG. 3.

FIG. 4 illustrates the result of changing the center point P of the map image M displayed within the map-image display frame F.

A description follows of the processing procedure for changing the display range of the map image with reference to FIG. 4.

When the map image M1 is displayed in the situation illustrated in FIG. 4 within the map-image display frame F in the web page on the user terminal T, if the user operates the user terminal T to display a section of the map image situated outside the map image M1 by moving the map image in a desired direction (in the south-east direction in the embodiment), the map OCX changes the center point of the map image displayed within the map-image display frame F, from the center point P1 of the map image M1 under display to a center point P2 moved in the south-east direction by a distance n designated by the user.

The map OCX calculates a longitudinal extent X2 and a latitudinal extent Y2 indicating the display range of a map image M2 to be newly displayed, on the basis of coordinate data obtained from the longitude and latitude of the new center point P2, by following a similar procedure to that described in FIG. 2. Then the map OCX derives unit map data files for displaying the unit images m forming the map image M2, and then performs in sequence the processing for reading each of the derived unit map data files.

In the case illustrated in FIG. 4, the unit images m forming the map image M2 to be newly displayed are identical to the unit images m forming the map image M1, but the center point P2 differs in its coordinates from the center point P1 of the map image M1. Accordingly, all the unit map data files used for displaying the map image M2 are cached by the cache component of the loader OCX when the map image M1 is displayed, so that the map images are read from the unit map data files so cached.

Movement from the center point P1 of the map image M1 to the center point P2 of the map image M2 by the distance n in the south-east direction, results in partial display of each of the unit images m situated in the display positions ①, ② and ④ in each of which the full range of the unit image m was displayed in the map image M1. Therefore, by following a similar procedure to that described in FIG. 3, for each of the display positions ①, ② and ④, the map OCX selects data used for displaying the section, included within the display range of the map image M2, from among the vector map data included in the unit map data file.

As a result of changing the center point of the map image M2 from P1 to P2, the unit image m corresponding to each of the display positions ③ and ⑦ has its partially displayed section in the map image M2 changed from that in the map image M1. In this case, as in the case described earlier, for each of the display positions ③ and ⑦, the map OCX selects data used for displaying the section, included within the display range of the map image M2, from among the vector map data included in the unit map data file.

Thus, the new map image M2 is displayed within the map image display frame F in the web page on the basis of the unit map data files read out through the procedure as described above and the selected data.

Figure 5:
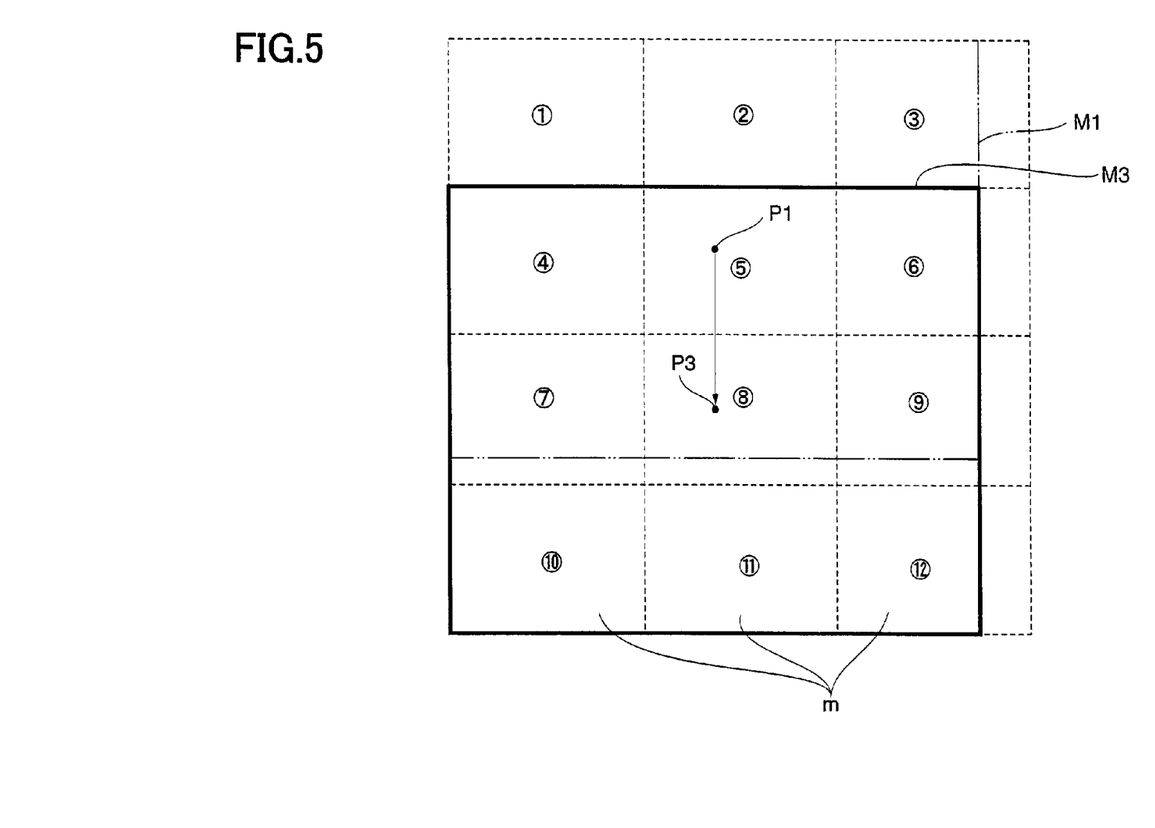
FIG. 5 is an explanatory diagram illustrating another example of moving the display range of the map image in FIG. 3.

FIG. 5 illustrates another case of changing the coordinates of the center point P1 of the map image M1 displayed within the map-image display frame F, in which some of the unit map data files required for displaying a new map image M3 differ from the unit map data files required for displaying the preceding map image M1.

When the center point of the map image displayed within the map-image display frame F is changed from P1 to P3, the unit images m displayed in the display positions ① to ③ on the map image M1 are not displayed. Instead of these, unit images m appear in display positions ⑩ to ⑫ situated on the south side of the display positions ⑦ to ⑨, respectively.

In the display positions ⑩ to ⑫, the unit map data files for displaying the corresponding unit images m are prepared by being read from the cache or by being retrieved from the map database site S through a similar procedure to that described in FIG. 2.

The changing of the display range of the unit image m corresponding to each of the display positions ⑦ to ⑨ shown in FIG. 5, and the selection processing for the data for displaying part of the unit image m corresponding to each of the display positions ⑩ to ⑫, are performed by following a similar procedure to that described in FIG. 3.

The foregoing describes an example where the map data for displaying the map image on the user terminal T are vector data. However, it is possible, for example, to use bit map data for displaying a map image through a similar system configuration and procedure.

The terms and description used herein are set forth by way of illustration only and are not meant as limitations. Those skilled in the art will recognize that numerous variations are possible within the spirit and scope of the invention as defined in the following claims.

What is claimed is:

1. A system of displaying map images allowing a user terminal to display a map image on the basis of map data transmitted from a map database site through a computer network, comprising:

a map information database provided in said map database site for accumulating the map data constructed of units of rectangular map images each with a display range smaller than a display range of a map image corresponding to one page displayed on a user terminal, in association with position data indicating the display ranges of the individual map images; and map-image display means provided in said user terminal for arranging the map data of a plurality of units with each other in columns and rows on the basis of the position data of the map data, which are read out from the map information database provided in the map database site and transmitted from the map database site, to form the map image corresponding to one page for display;

wherein said map-image display means detects display positions in relation to the display range of the map image designated on the user terminal, on the basis of said position data included in said individual units of the map data transmitted from said map database site, and displays the map images, generated from the map data of the respective units, in said corresponding display positions detected; and wherein when the display area of the one-page map image displayed on the user terminal is not equal to an integral multiple of the display area of the map image generated from the map data of the individual unit, with regard to the unit of the map data for displaying the map image straddling the display region and the non-display region of the map image on the user terminal, the map-image display means selects the map data for displaying a map image of the section included in the display region of the map image on the user terminal, from the map data of the unit concerned, and then displays the map image based on the selected map data.

2. A system of displaying map images according to claim 1, wherein said map database site selects the units of the map data to be read out from said map information database, on the basis of coordinate data, indicating the display range of the map image designated on the user terminal, and the position data included in each of the units of the map data, for transmission to the user terminal.

3. A system of displaying map images according to claim 1, wherein when a change in the designation of the display range of the map image is made on the user terminal, said map-image display means reads out the map data that is common to each of the map data that forms the map image before the change is made and the map data that forms the map image to be displayed after the change is made in order to display the map image after the change is made.

4. A system of displaying map images according to claim 3, wherein:

when the map data cached are read out for displaying the map image, said map-image display means transmits data representing versions of the units of the map data concerned to the map database site;

when said map database site determines, based on the transmitted data, that a unit of map data of an updated version is not registered in said map information database, said map-image display means displays the map image on the basis of the cached map data; and when said map database site determines, based on the transmitted data, that a unit of map data of an updated version is registered in said map information database, said map-image display means receives the unit of the map data of the updated version from said map database site for displaying the map image.

5. A system of displaying map images allowing a user terminal to display a map image on the basis of map data transmitted from a map database site through a computer network, comprising:

a map information database provided in said map database site for accumulating the map data constructed of units of rectangular map images each with a display range smaller than a display range of a map image corresponding to one page displayed on a user terminal, in association with position data indicating the display ranges of the individual map images; and map-image display means provided in said user terminal for arranging the map data of a plurality of units with each other in columns and rows on the basis of the position data of the map data, which are read out from the map information database provided in the map database site and transmitted from the map database site, to form the map image corresponding to one page for display;

wherein when a change in the designation of the display range of the map image is made on the user terminal, said map-image display means reads out, from the map data cached when the map image before the change is made, the map data that is common to each of the map data that forms the map image before the change is made and the map data that forms the map image to be displayed after the change is made and obtains, from the map database site, only the map data for the map image of the section newly displayed after the change is made, in order to display the map image after the change is made.

6. A system of displaying map images according to claim 5, wherein said map-image display means detects display positions in relation to the display range of the map image designated on the user terminal, on the basis of said position data included in said individual units of the map data transmitted from said map database site, and displays the map images, generated from the map data of the respective units, in said corresponding display positions detected.

7. A system of displaying map images according to claim 6, wherein when said units of the map data for displaying the map images in said detected display positions include map data on a section outside the display range of the map image designated, said map-image display means detects map data on a section included within the display range of the designated map image, from the map data of the units concerned for display of map images.

8. A system of displaying map images according to claim 5, wherein said map database site selects the units of the map data to be read out from said map information database, on the basis of coordinate data, indicating the display range of the map image designated on the user terminal, and the position data included in each of the units of the map data, for transmission to the user terminal.

9. A system of displaying map images according to claim 5, wherein:

when the map data cached are read out for displaying the map image, said map-image display means transmits data representing versions of the units of the map data concerned to the map database site;

when said map database site determines, based on the transmitted data, that a unit of map data of an updated version is not registered in said map information database, said map-image display means displays the map image on the basis of the cached map data; and when said map database site determines, based on the transmitted data, that a unit of map data of an updated version is registered in said map information database, said map-image display means receives the unit of the map data of the updated version from said map database site for displaying the map image.

10. A method of displaying map images for allowing a user terminal to display a map image on the basis of map data transmitted from a map database site through a computer network, comprising the steps of:

accumulating, in a map information database provided in the map information database site, the map data constructed of units of rectangular map images each with a display range smaller than a display range of a map image corresponding to one page to be displayed on the user terminal, in association with position data indicating the display ranges of the individual map images;

arranging, in the user terminal, a plurality of map images generated from the map data of the individual units in columns and rows on the basis of the position data of the map data, read out from the map information database of the map database site and transmitted from the map database site, to form the map image corresponding to one page for display;

detecting display positions in relation to the display range of the map image designated on the user terminal, on the basis of the position data included in the individual units of the map data transmitted from the map database site; and displaying the map images generated from the map data of the respective units in the corresponding display positions detected;

wherein when the display area of the one-page map image displayed on the user terminal is not equal to an integral multiple of the display area of the map image generated from the map data of the individual unit, with regard to the unit of the map data for displaying the map image straddling the display region and the non-display region of the map image on the user terminal, the map-image display means selects the map data for displaying a map image of the section included in the display region of the map image on the user terminal, from the map data of the unit concerned, and then displays the map image based on the selected map data.

11. A method of displaying map images according to claim 10, further comprising the step of:

making, in the map database site, a comparison between coordinate data indicating the display range of the map image designated on the user terminal, and the position data included in each of the units of the map data, in order to select and read out the units of the map data for displaying the map images within the display region of the designated map image from the map information database.

12. A method of displaying map images according to claim 10,further comprising the steps of:

determining, when a change in the designation of the display range of the map image is made on the user terminal, whether or not there exists units common to the map data forming the map image displayed before the change is made and the map data forming the map image to be displayed after the change is made; and reading out the common units from the units of the map data cached at the time when the single map image is displayed before the change is made, for displaying the map image after the change is made.

13. A method of displaying map images according to claim 12 further comprising the steps of:

transmitting data representing versions of the units of the map data read out from the map data cached, to the map database site;

determining, in the map database site, whether or not an updated version of a unit of map data is registered in the map information database, on the basis of the transmitted data; and after determining that the updated version of the unit of the map data is not registered, displaying the map image on the basis of the cached map data; or after determining that the updated version of the unit of the map data is registered, displaying the map image on the basis of the map data of the unit of the updated version transmitted from the map database site.

14. A method of displaying map images for allowing a user terminal to display a map image on the basis of map data transmitted from a map database site through a computer network, comprising the steps of:

accumulating, in a map information database provided in the map information database site, the map data constructed of units of rectangular map images each with a display range smaller than a display range of a map image corresponding to one page to be displayed on the user terminal, in association with position data indicating the display ranges of the individual map images; and arranging, in the user terminal, a plurality of map images generated from the map data of the individual units in columns and rows on the basis of the position data of the map data, read out from the map information database of the map database site and transmitted from the map database site, to form the map image corresponding to one page for display;

determining, when a change in the designation of the display range of the map image is made on the user terminal, whether or not there exist units common to the map data forming the map image displayed before the change is made and the map data forming the map image to be displayed after the change is made; and reading out, when there exist the common units, the common units from the units of the map data cached at the time when the single map image is displayed before the change is made, and obtaining only the units of map data for the map image of the section newly displayed after the change is made, from the map database site, for displaying the map image after the change is made.

15. A method of displaying map images according to claim 14, further comprising the steps of:

detecting display positions in relation to the display range of the map image designated on the user terminal, on the basis of the position data included in the individual units of the map data transmitted from the map database site; and displaying the map images generated from the map data of the respective units in the corresponding display positions detected.

16. A method of displaying map images according to claim 15, further comprising the step of:

determining whether or not the units of the map data for displaying the map images in the detected display positions include map data representing a section outside the display range of the map image designated, to prevent displaying of a map image represented by map data corresponding to the section outside the display range of the designated map image, of the map data of the determined units.

17. A method of displaying map images according to claim 14, further comprising the step of:

making, in the map database site, a comparison between coordinate data indicating the display range of the map image designated on the user terminal, and the position data included in each of the units of the map data, in order to select and read out the units of the map data for displaying the map images within the display region of the designated map image from the map information database.

18. A method of displaying map images according to claim 14, further comprising the steps of:

transmitting data representing version of the units of the map data read out from the map data cached, to the map database site;

determining, in the map database site, whether or not an updated version of a unit of map data is registered in the map information database, on the basis of the transmitted data; and after determining that the updated version of the unit of the map data is not registered, displaying the map image on the basis of the cached map data; or after determining that the updated version of the unit of the map data is registered, displaying the map image on the basis of the map data of the unit of the updated version transmitted from the map database site.

* * * * *